(12) United States Patent
Cecchi et al.

(10) Patent No.: US 6,944,239 B2
(45) Date of Patent: Sep. 13, 2005

(54) CMOS RECEIVER FOR SIMULTANEOUS BI-DIRECTIONAL LINKS

(75) Inventors: Delbert Raymond Cecchi, Rochester, MN (US); Charles C. Hanson, Kenyon, MN (US); Curtis Walter Preuss, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 768 days.

(21) Appl. No.: 10/037,537

(22) Filed: Jan. 2, 2002

(65) Prior Publication Data

US 2003/0123570 A1 Jul. 3, 2003

(51) Int. Cl.[7] ............................................. H04L 27/38
(52) U.S. Cl. ........................ 375/316; 375/257; 326/86
(58) Field of Search ................................ 375/285, 295, 375/316, 318, 257, 219–220; 327/52, 108–111; 326/30, 64, 81, 86

(56) References Cited

U.S. PATENT DOCUMENTS

| | | | |
|---|---|---|---|
| 4,958,133 A | | 9/1990 | Bazes ......................... 330/253 |
| 5,541,535 A | * | 7/1996 | Cao et al. ...................... 326/83 |
| 5,666,354 A | | 9/1997 | Cecchi et al. ................ 370/284 |
| 5,898,297 A | * | 4/1999 | Bosnyak et al. ............. 323/315 |
| 6,070,211 A | * | 5/2000 | Neal et al. ................... 710/106 |
| 6,304,106 B1 | | 10/2001 | Cecchi et al. .................. 326/86 |
| 6,507,225 B2 | * | 1/2003 | Martin et al. ................ 327/108 |
| 6,771,675 B1 | * | 8/2004 | Cao et al. .................... 370/537 |
| 6,836,290 B1 | * | 12/2004 | Chung et al. ................ 348/294 |

* cited by examiner

Primary Examiner—Tesfaldet Bocure
Assistant Examiner—Khanh Tran
(74) Attorney, Agent, or Firm—Robert R. Williams

(57) ABSTRACT

Methods and apparatus are provided for implementing a receiver capable of receiving signals in simultaneous bi-directional current mode differential links. The receiver comprises a resistor-summing network and a differential amplifier. The resistor-summing network can also comprise capacitors for the purpose of attenuating high-frequency noise at the differential amplifier. The high-frequency noise can arise from impedance discontinuities in the signal paths or from differences in rising or falling transition times between the data driver and the replica driver in the links.

11 Claims, 5 Drawing Sheets

CMOS RECEIVER FOR SIMULTANEOUS BI-DIRECTIONAL LINKS

FIELD OF THE INVENTION

The present invention relates to differential receiver circuits, and in particular, differential receiver circuits utilized in Complementary Metal Oxide Semiconductor (CMOS) simultaneous bi-directional full-duplex links.

DESCRIPTION OF THE RELATED ART

A bi-directional link can be used in any situation where two devices must communicate with each other. A first communicating device can send data to a second communicating device, while the second communicating device can be sending data to the first communicating device. The advantages of bi-directional links over conventional methods include a reduction in the wiring between communicating devices and a reduction in the number of connector pins on each communicating device.

Such a bi-directional link is disclosed in U.S. Pat. No. 5,216,667 issued on Jun. 1, 1993 to Chu, et al.. This reference describes a bi-directional transceiver for use on a full-duplex link. However, it uses a single wire for signaling, which has a limited tolerance to noise. Furthermore, a local reference voltage is required to compare with received signals.

Differential signaling is often used in signal transmission where undesirable electrical noise may be induced on the transmission line. Such electrical noise in single-wire signaling can cause the signal voltage to rise above or fall below its acceptable threshold voltage, resulting in faulty switching at the receiving end. Differential signaling, on the other hand, simultaneously transmits two signals that are complements of each other. The logic state of a particular bit of information transmitted by a differential signal can be determined by taking the difference of the two signals' voltage levels. Since these two signals are transmitted on physically adjacent transmission lines, electrical noise induced on one line is also induced on the other. Undesirable noise therefore may affect the two signals, but the difference between the two remains substantially the same. The advantages of differential signaling are well-known for conventional differential links.

A bi-directional link utilizing differential signaling is shown in U.S. Pat. No. 4,638,473, by Cooperman, et al., issued Jan. 20, 1987. The Cooperman et al. differential design subtracts the differential line voltages in the receiver through the use of alternately switching capacitors. For proper operation, the capacitors must switch at about five times the transmission bit rate. This design substantially limits the data transfer rate, as the data rate can only be as high as one-fifth of the switching speed of the device technology.

Another differential bi-directional link is presented in U.S. Pat. No. 4,393,494, by Belforte et al., issued Jul. 12, 1983. The Belforte et al. design uses external biasing voltages in providing current generators within the receiver.

Another differential bi-directional link is presented in U.S. Pat. No. 5,666,354, by Cecchi et al., issued Sep. 9, 1997, which is included herein by reference. This patent teaches a simultaneous bi-directional CMOS current-mode link comprising a data driver, a replica driver, and a differential receiver, wherein the receiver is capable of receiving a signal sent by a far data driver at the same time the near data driver is sending a signal on the transmission line. The Cecchi et al. design provides a receiver that improves a high performance, self-biasing, wide common mode differential receiver as presented in U.S. Pat. No. 4,958,133, by Bazes, issued Sep. 18, 1990. The receiver improvement in the Cecchi et al. design provides additional Field Effect Transistors (FETs) that produce a difference between voltages on a pair of chip pads through which data passes on the simultaneous bi-directional link, and voltages on a pair of on-chip replica driver outputs.

Another differential bi-directional link is presented in U.S. Pat. No. 6,304,106B1, by Cecchi et al., issued Oct. 16, 2001, which is herein included by reference. This patent teaches a CMOS bi-directional current mode differential link with precompensation. This patent focuses on the precompensation circuit and teaches no receiver circuit innovations over the earlier cited Cecchi et al. patent U.S. Pat. No. 5,666,354.

In U.S. Pat. No. 5,666,354, no provision was made for filtering out high-frequency noise that can result from discontinuities in the signaling wires, resulting from a signal passing through a cable connection, or a connection between a module and a printed circuit card, all such discontinuities and connections being well-known in the art. Small differences in transition rates of delays between the data driver and the replica driver also provide a component of high-frequency noise.

Therefore, a need exists for a differential receiver that takes the difference of a differential driver output voltage and a replica differential driver voltage in a simultaneous bi-directional communication link, but which is less sensitive to transition matching, and noise produced on the transmission line over which signals are sent and received.

SUMMARY OF THE INVENTION

A principle object of the present invention is to provide an improved method and apparatus for receiving differential simultaneous bi-directional signals. Another object is to provide suitable filtering of small reflection noise pulses while receiving differential simultaneous bi-directional signals.

In brief, a simultaneous differential bi-directional driver/receiver comprises a data driver, a replica driver, and a receiver. The data driver is electrically coupled via a pad for each phase to a signaling conductor, also known as a transmission line, for each phase that couples the differential signal to a similar differential bi-directional driver/receiver link on a separate semiconductor chip. The similar link is referred to as the far link. The data driver drives signals on the conductors in response to input data coupled to an input of the data driver. The same input data is coupled to the input of the replica driver. In the absence of a signal driven by a far data driver in the far link on the separate chip, the data driver and the replica driver will have the same voltage, in an ideal situation in which all electrical components are perfect. Signals driven by the remote data driver will cause the voltage output of the data driver and the replica driver to differ, and that difference must be properly received as data sent by the remote data driver.

The receiver in the present invention comprises a resistor-summing network coupled to the outputs of the replica driver and to the outputs of the data driver. One portion of the resistor network outputs an average voltage of the positive phase of the reference driver and the negative phase of the data driver. A second portion of the resistor-summing network outputs an average voltage of the negative phase of the reference driver and the positive phase of the data driver.

The two outputs of the resistor network are coupled to the inputs of a conventional differential amplifier. The output of the conventional differential amplifier is the data sent by the remote data driver. Capacitors can be coupled between nodes on the resistor-summing network and ground to attenuate high frequency noise at the inputs of the differential amplifier.

DETAILED DESCRIPTION OF THE PREFERRED EMBODIMENTS

Figure 1:
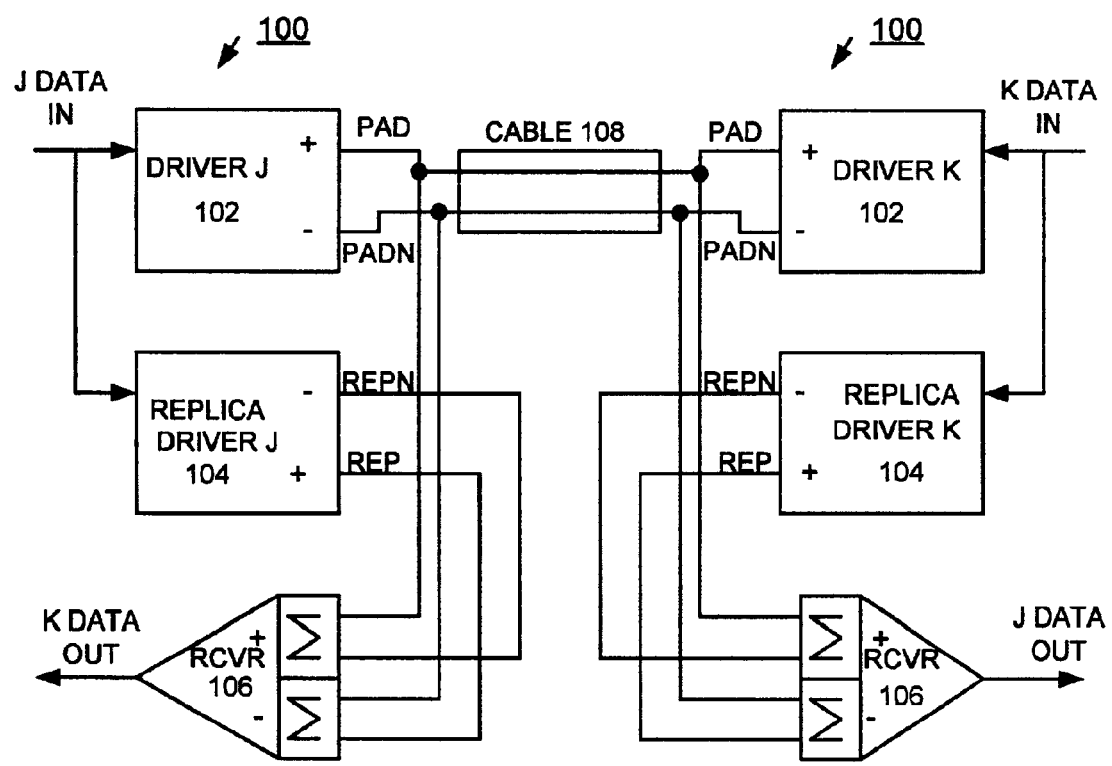
FIG. 1 shows a configuration comprising a cable with a simultaneous bi-directional differential current mode receiver/driver link coupled to each end of the cable.

Having reference now to the figures, and in particular FIG. 1, there is shown a CMOS bi-directional current mode differential link generally designated by the reference character 100. The CMOS bi-directional current mode differential link 100 includes a driver 102 and a replica driver 104. Driver 102 and replica driver 104 are coupled to a receiver 106. As shown in FIG. 1, a differential wire pair 108 couples two CMOS bi-directional current mode differential links 100. Such a differential wire pair 108 is also known as a transmission line. CMOS bi-directional current mode differential link 100 provides for simultaneous bi-directional signaling over the differential wire pair. "J DATA IN" is data to be driven from the left instance of link 100 to the right instance of link 100, to be received as "J DATA OUT". "K DATA IN" is data to be driven from the right instance of link 100 to the left instance of link 100, to be received as "K DATA OUT".

U.S. Pat. No. 6,304,106 B1, already included by reference, describes a data driver and replica driver suitable for use as driver 102 and replica driver 104, including the termination networks required to eliminate reflections, and which create voltage drops from currents passing through the termination resistors.

U.S. Pat. No. 6,304,106 B1 further shows a differential receiver 106 respondent to the difference between (PAD+REPN) and (PADN+REP). No detail was presented in the receiver embodiment, and the known art at the time will be presented below in the discussion of FIG. 3.

Figure 2:
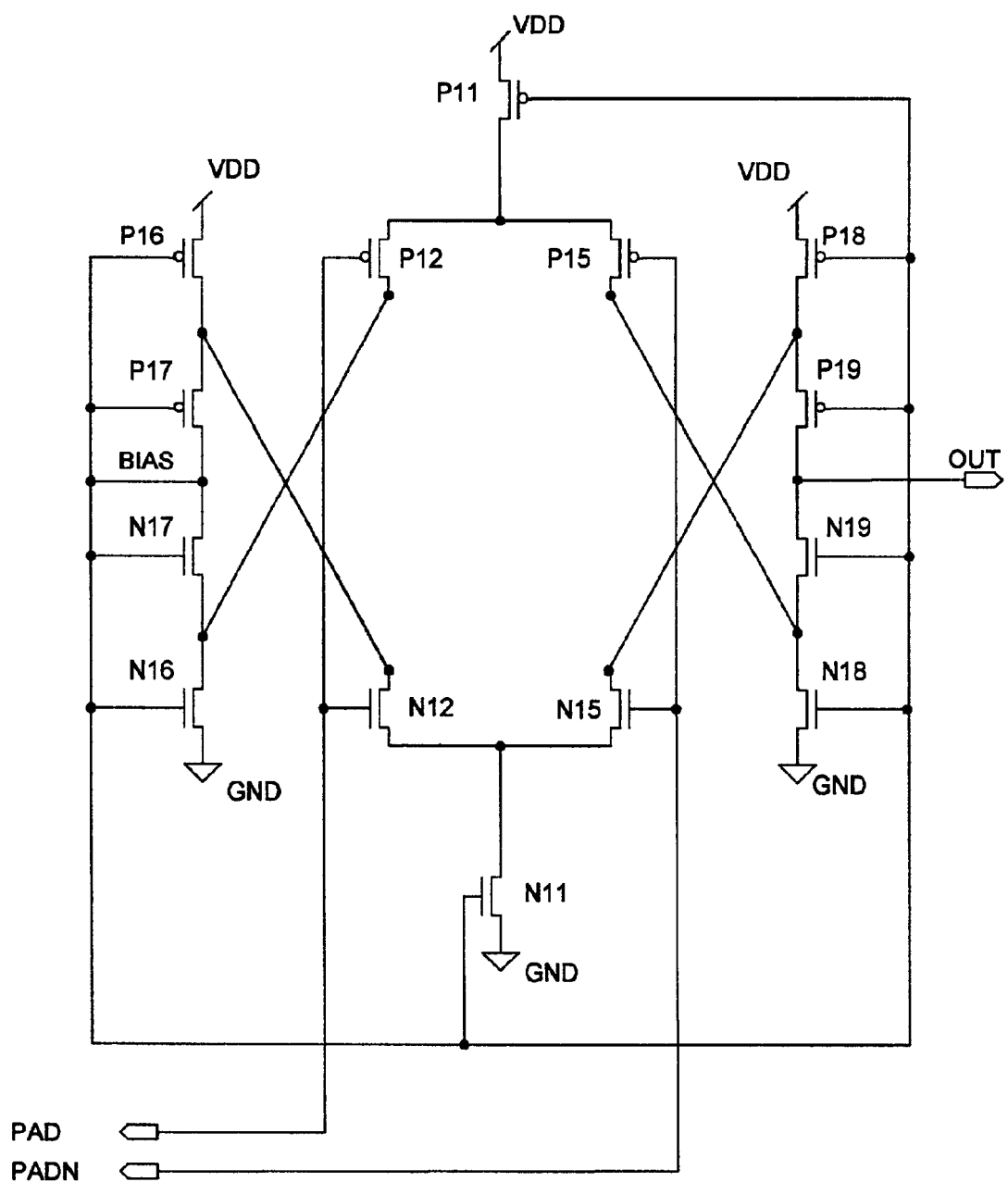
FIG. 2 shows a conventional, prior art, differential amplifier as taught by U.S. Pat. No. 4,958,133, by Bazes, issued Sep. 18, 1990.

FIG. 2 shows a CMOS Complementary self-biased differential amplifier, generally referred to as 200, with rail-to-rail common-mode input-voltage range as described in U.S. Pat. No. 4,958,133 by Bazes, hereinafter Bazes, as cited above. Differential amplifier 200 is but one example of a differential amplifier; other designs can be used as the differential amplifier used in the present invention. The differential amplifier 200 is utilized in the preferred embodiment because of its high speed and rail-to-rail common mode input-voltage range.

Figure 3:
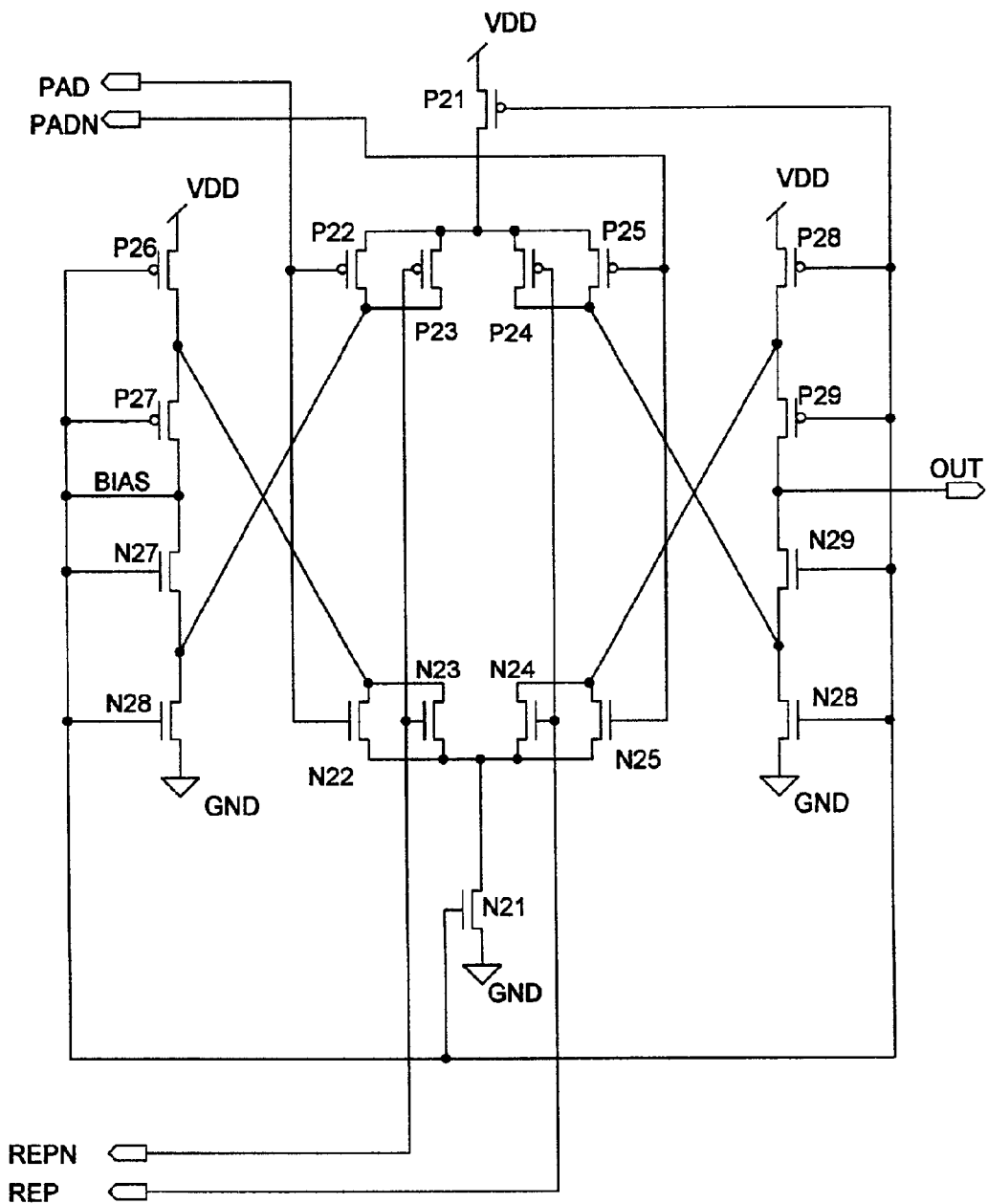
FIG. 3 shows a modification of the conventional differential amplifier of FIG. 2 as taught in U.S. Pat. No. 5,666,354, by Cecchi et al., issued Sep. 9, 1997.

FIG. 3 shows a modification of the differential amplifier of Bazes as taught by U.S. Pat. No. 5,666,354, already included by reference. The modification of the differential amplifier provides for the summing of PAD+REPN as well as PADN+REP, and has been the known method of providing these sums prior to the present invention. U.S. Pat. No. 6,304,106 B1 teaches, at Column 3, lines 19–29, that "The voltage across the terminator 222 is due to the sum of currents from both the near and the far driver 102. The receiver 106 on either end subtracts the voltage due to the near driver 102 from the total voltage across the terminator 222, leaving the voltage due to the far driver 102. The receiver output Z of an AND gate 228 is: Z=(PAD+REPN)−(PADN+REP). If the differential voltage from the incoming signal is positive, a "1" is being received. If the differential voltage from the incoming signal is negative, a "0" is being received". Thus, a summing circuit is required prior to or as part of the differential amplifier portion of the receiver.

To highlight the modification of U.S. Pat. No. 5,666,354 over Bazes to provide the summing function lacking in Bazes, refer to FIG. 2 again. Inputs to the differential amplifier PAD and PADN are coupled to N-channel Field Effect Transistors (NFETs) N12 and N15 as well as P-channel Field Effect Transistors (PFETs) P12 and P15. N11 provides a current dependent upon the voltage existing on node BIAS. P11 also provides a current dependent upon the voltage existing on node BIAS. N12 and N15 share the current of N11, dependent upon the voltage difference between PAD and PADN. When PAD is of a higher voltage than PADN, N12 will conduct a larger portion of the current through N11, and N15 will conduct a smaller portion, responding to the voltage difference between PAD and PADN. Similarly, P12 and P15 share the current from P11, again, dependent upon the difference between PAD and PADN. In FIG. 3, N12 has been replaced by the parallel combination of N22 and N23. N22, like N12, has a gate coupled to PAD. N23 has a gate coupled to REPN. N22 and N23 have their respective sources and drains coupled together. Therefore, the total current from the common source node of N22 and N23 is simply the sum of the source currents of N22 and N23. A similar current summing occurs in the case of the N24/N25 combination, the P24/P25 combination, and the P22/P23 combination. The summing function is therefore merged into the differential amplifier itself.

The receiver described in U.S. Pat. No. 5,666,354, reproduced in FIG. 3, works very well when the semiconductor process tolerances are such that FET devices designed to identical dimensions have very nearly identical electrical performance. It is well known, however, that mistracking of electrical characteristics in FET devices does occur, and in some semiconductor processes, can be significant. For example, if a first FET is physically placed near a number of other FETs, and a second FET of the same physical dimensions does not have the same number of nearby FETs surrounding it, effective FET channel lengths will differ between the first FET and the second FET. Significant mistracking of FET devices N22 and N23; N24 and N25; P22 and P23; and P24 and P25 will cause inaccuracies in the summing functions of the receiver.

The receiver described in U.S. Pat. No. 5,666,354 integrates the summing function (i.e., (PAD+REPN), (PADN+REP) directly into the differential amplifier through coupling to the FET gates as described above. The differential amplifier itself passes extremely high frequency noise signals.

Such noise signals can be caused by impedance discontinuities in the signaling wires (transmission lines). Another likely source of such high-frequency noise is any small difference in rise or fall transition between the data driver and the replica driver due to process mistracking or loading differences between the data driver and the replica driver. The design of U.S. Pat. No. 5,666,354 does not provide ready means for filtering such very high frequency noise signals, since the summing components are high performance FET devices.

Figure 4:
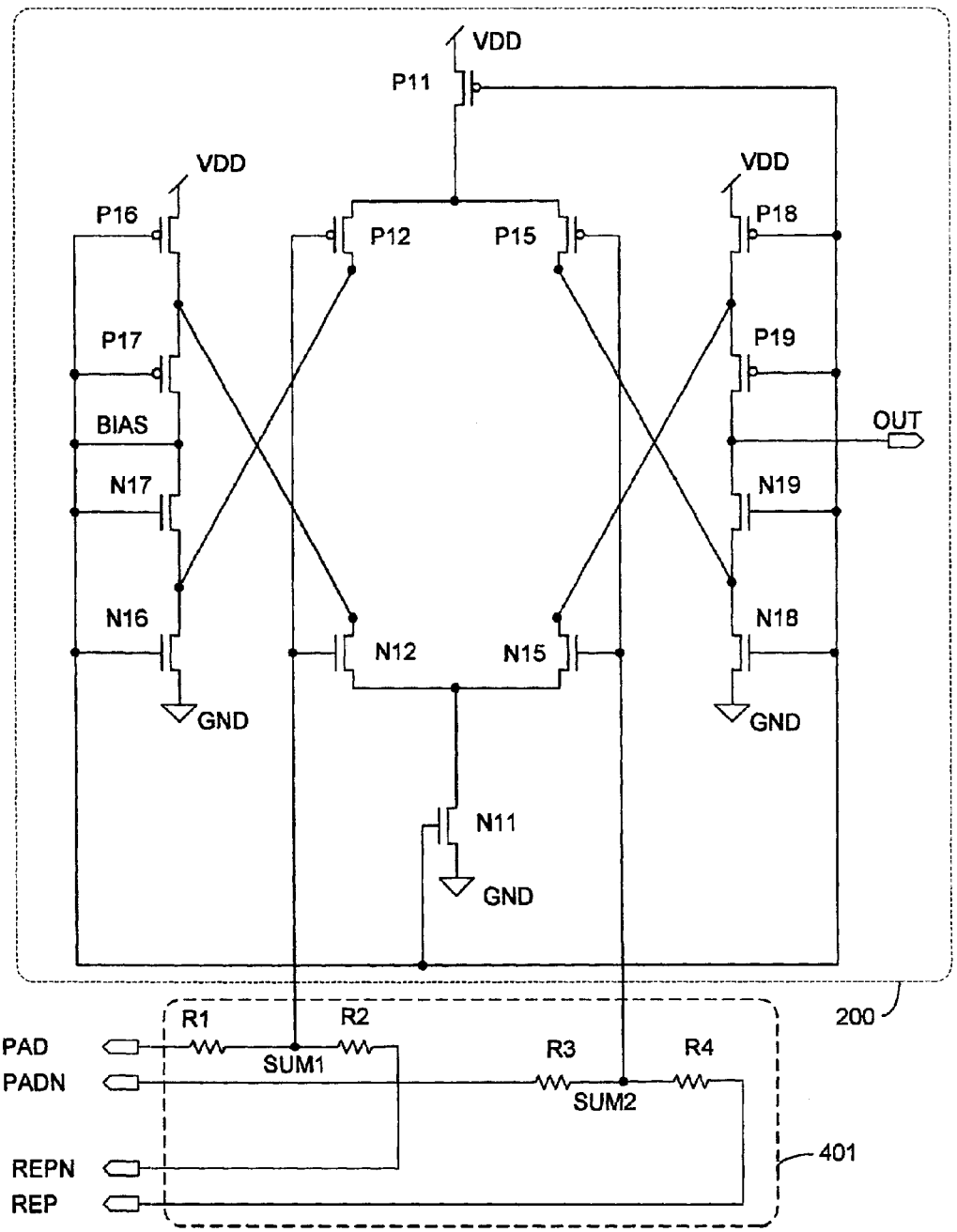
FIG. 4 shows a resistor-summing network of the present invention coupled to the PAD, PADN, REP, and REPN nodes. The outputs of the resistor-summing network are further coupled to the inputs of the conventional differential amplifier shown in FIG. 2.

Turning now to FIG. 4, the preferred embodiment of the present invention is shown. A conventional differential amplifier 200 provides the subtraction function. Differential amplifier 200 is preferably the Bazes differential amplifier shown in FIG. 2, however, any suitable differential amplifier could be utilized. The summing functions are provided by resistor-summing network 401. Resistor-summing network 401 comprises four resistors, R1, R2, R3, and R4. The resistor-summing network is coupled to PAD, PADN, REP, and REPN as inputs, and outputs signals on nodes SUM1 and SUM2 to differential amplifier 200.

A first end of R1 is coupled to PAD. A second end of R1 is coupled to a first end of R2, and further coupled to the gates of N12 and P12 of differential amplifier 200. The node comprising the second end of R1, the first end of R2, and the gates of N12 and P12 is designated as SUM1. A second end of R2 is coupled to REPN. In the preferred embodiment, R1 and R2 are of equal resistance value. R1 and R2 should be of sufficiently high resistance so as not to interfere with the terminating resistances of the data driver 102 or the replica driver 104. For example, if the characteristic impedance of the cable 108 is 50 ohms, R1 and R2 should preferably 1000 ohms or more. In the preferred case where R1=R2, node SUM1 will have a voltage of:

$$SUM1=(PAD+REPN)/2$$

A first end of R3 is coupled to PADN. A second end of R3 is coupled to a first end of R4, and further coupled to the gates of N15 and P15 of differential amplifier 200. The node comprising the second end of R3, the first end of R4, and the gates of N15 and P15 is designated as SUM2. In the preferred embodiment, R3 and R4 are of equal resistance value. R3 and R4, like R1 and R2, should be of sufficiently high resistance so as not to interfere with the terminating resistances of the data driver 102 or the replica driver 104. In the preferred case where R3=R4, node SUM2 will have a voltage of:

$$SUM2=(PADN+REP)/2$$

SUM1 is coupled to the gates of N12 and P12, which comprise the positive input of differential amplifier 200. SUM2 is coupled to the gates of N15 and P15, which comprise the negative input of differential amplifier 200. Output OUT of differential amplifier 200 can be expressed, where the gain is 2A, as $$OUT=2A*(SUM1-SUM2)$$

Rewriting, $$OUT=A*((PAD+REPN)-(PADN+REP))$$

Which is the desired function for the simultaneous current mode bi-directional receiver.

Resistors R1, R2, R3, and R4 can be implemented off the semiconductor chip, but are preferably implemented on the semiconductor chip to avoid the introduction of capacitive and inductive parasitics on the signaling wiring. Resistors on semiconductor chips can be constructed from metal wiring, from areas of doped semiconductor, or from areas of polysilicon material. Tracking between such on chip resistors is typically excellent, with electrical characteristics typically tracking within 1.5% for resistors of similar physical dimensions integrated on semiconductor chips. The tolerance on the values of R1, R2, R3, and R4 is not very important. It is very important that the resistors track closely. For example, a semiconductor process may provide resistor values that can vary 25% from one chip to another. Such tolerance is very acceptable to this invention. However, on a particular chip, R1, R2, R3, and R4 must track within approximately 2% of each other's relative value.

Figure 5:
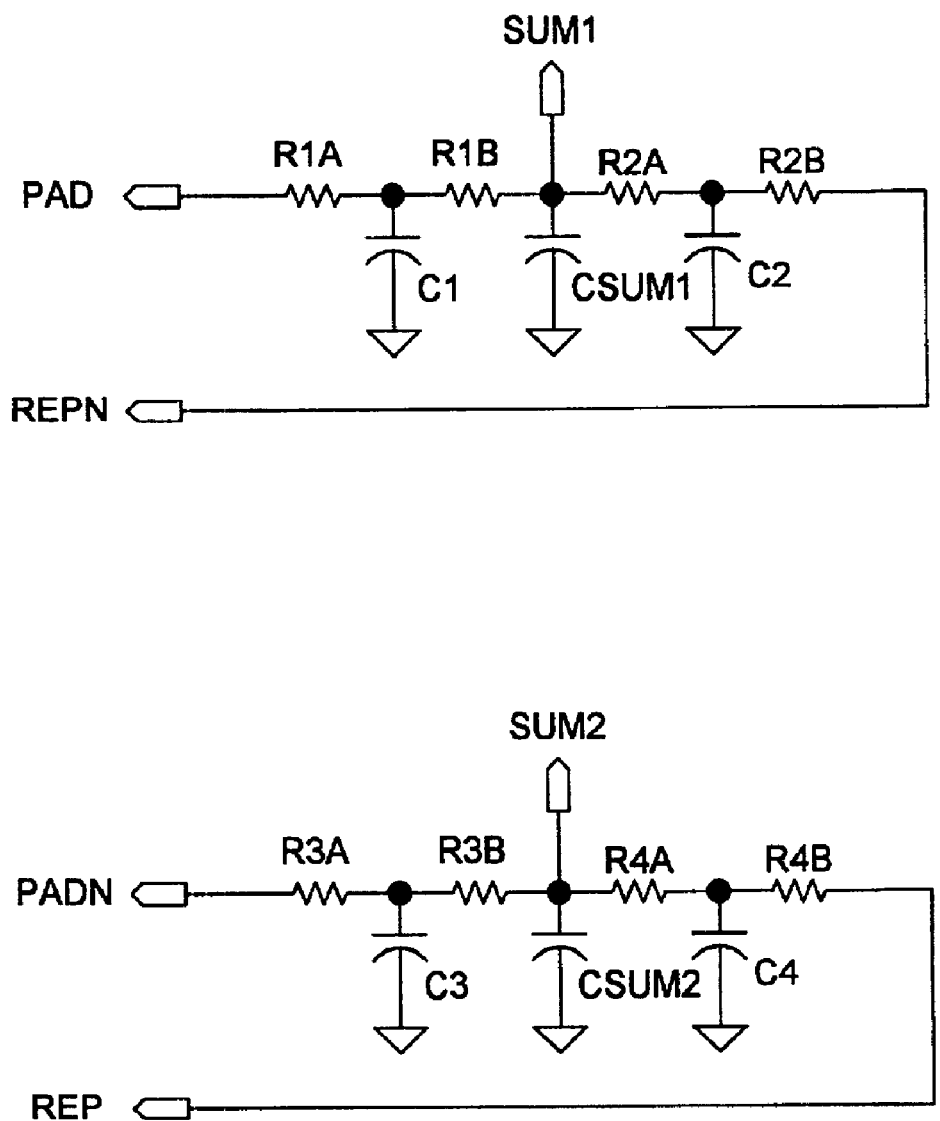
FIG. 5 shows a variation of the resistor-summing network of FIG. 4, in which resistors have been split into series-coupled resistors and capacitors have been added.

FIG. 5 shows a further enhancement of the resistor-summing network shown as 401 in FIG. 4. The enhancement provides for filtering high frequency noise signals resulting from mismatches in delays, rise times, or fall times between the data driver and the replica driver. In FIG. 5, resistor R1 has been split into two series-coupled resistors, R1A and R1B. R2 has been split into two series-coupled resistors, R2A and R2B. R3 has been split into two series-coupled resistors, R3A and R3B. R4 has been split into two series-coupled resistors, R4A and R4B. Capacitor C1 has been added, a first end of C1 being coupled to the node where R1A and R1B are coupled; a second end of C1 is coupled to ground. Note that the second end of C1 could alternatively be coupled to a positive supply voltage, or even a negative supply voltage instead of being coupled to ground. Such supply voltages are designed to be well decoupled to ground and are well-known in the art as "AC grounds", meaning that capacitive decoupling of high frequency signals to an "AC ground" is electrically equivalent to capacitively decoupling the high frequency signals to ground. Capacitor decoupling to ground in this invention includes decoupling to an "AC ground". Similarly, capacitors C2, C3, and C4 have been added as shown in FIG. 5. CSUM1 is shown with a first end coupled to node SUM1 and a second end coupled to ground. CSUM2 is shown with a first end coupled to node SUM2 and a second end coupled to ground. Nodes SUM1 and SUM2 are respectively coupled to the positive and negative inputs of differential amplifier 200 as shown in FIG. 4. Capacitors C1, C2, C3, C4, CSUM1, and CSUM2 are added to the resistor-summing network for the purpose of filtering out high frequency noise that can appear on PAD and PADN, or which effectively result from differences in delays or rise and fall times between the data driver and the replica driver. Not all of the capacitors C1, C2, C3, C4, CSUM1, and CSUM2 need be used in any particular embodiment. The various resistances in the resistor summing network 401 can be further divided, with additional capacitors added, to obtain additional filtering characteristics, as will be appreciated by those skilled in the art. The resistor/capacitor network is designed to substantially block, or attenuate, very high frequencies while substantially passing frequencies associated with the signals being transmitted and received. The network shown in FIG. 5 is exemplary and is not intended to be limiting. Attenuation of high-frequency noise is not dependent on splitting R1 into R1A and R1B; R2 into R2A and R2B; R3 into R3A and R3B; R4 into R4A and R4B. For example, CSUM1 can be coupled between node SUM1 and ground in FIG. 4; CSUM2 can be coupled between SUM2 and ground in FIG. 4.

While the present invention has been described with reference to the details of the embodiments of the invention shown in the drawings, these details are not intended to limit the scope of the invention as claimed in the appended claims.

What is claimed is:

1. A Complementary Metal Oxide Semiconductor (CMOS) bi-directional current mode differential link comprising:
   a CMOS driver receiving a data input and having an output coupled to a transmission line;
   a CMOS replica driver receiving said data input and providing a replica driver output substantially equal to said CMOS driver output;
   a CMOS receiver coupled to both said transmission line and replica driver output; said CMOS receiver comprising a resistor summing network and a differential amplifier; resistor summing network comprises:
   a first resistor, a first end of said first resistor being coupled to positive phase output node of said CMOS driver;
   a second resistor, a first end of said second resistor being coupled to a second end of said first resistor, and a second end of said second resistor being coupled to a negative phase output of said replica driver;
   a third resistor, a first end of said third resistor being coupled to a negative phase output of said CMOS driver; and
   a fourth resistor, a first end of said fourth resistor being coupled to a second end of said third resistor, and a second end of said fourth resistor being coupled to a positive phase output of said replica driver; and
   said CMOS driver and said CMOS replica driver including a plurality of parallel current sources; each of said current sources being arranged to send positive or negative current through a load responsive to an applied control signal.

2. The CMOS bi-directional current mode differential link of claim 1, wherein said differential amplifier comprises:
   a first input coupled to a first node comprising said second end of said first resistor and said first end of said second resistor; and
   a second input coupled to a second node comprising said second end of said third resistor and said first end of said fourth resistor.

3. The CMOS bi-directional current mode differential link of claim 1, wherein said first resistor, said second resistor, said third resistor, and said fourth resistor are each of resistance magnitude at least ten times the characteristic impedance of said transmission line.

4. The CMOS bi-directional current mode differential link of claim 1, further comprising:
   a first capacitor, a first end of said first capacitor being coupled to said first input of said differential amplifier, and a second end of said first capacitor being coupled to ground; and
   a second capacitor; a first end of said second capacitor being coupled to said second input of said differential amplifier, and a second end of said second capacitor being coupled to ground.

5. The CMOS bi-directional current mode differential link of claim 1, wherein at least one of said first, second, third, and fourth resistors is split into a plurality of series-connected resistors, each coupling of two of said series-connected resistors defining an inter-resistor node.

6. The CMOS bi-directional current mode differential link of claim 5, wherein at least one instant node of said inter-resistor nodes is further coupled to a first end of an inter-resistor capacitor instance unique to the instant node, and where a second end of each said inter-resistor capacitor instance is coupled to ground.

7. A method of receiving signals in a CMOS bi-directional current mode differential link, wherein said link comprises a data driver receiving a data input and having an output coupled to a first end of a transmission line; a replica driver receiving said data input and providing a replica driver output substantially equal to said data driver output; a receiver comprising a resistor-summing network and a differential amplifier; and said data driver and said replica driver including a plurality of parallel current sources; each of said current sources in said plurality of current sources being arranged to send positive or negative current through a load responsive to an applied control signal; said receiver capable of receiving a signal sent from a similar link coupled to a second end of said transmission line; said method comprising the steps of:
   coupling a positive phase output of said data driver to a first end of a first resistor in said resistor-summing network;
   coupling a second end of said first resistor to a first input of said differential amplifier, and further coupling said second end of said first resistor to a first end of a second resistor in said resistor-summing network;
   coupling a second end of said second resistor to a negative phase output of said replica driver;
   coupling a negative phase output of said data driver to a first end of a third resistor in said resistor-summing network;
   coupling a second end of said third resistor to a second input of said differential amplifier, and further coupling said second end of said third resistor to a first end of a fourth resistor in said resistor-summing network; and
   coupling a second end of said fourth resistor to a positive phase output of said replica driver.

8. The method of claim 7, further comprising the step of splitting at least one of said first, second, third, and fourth resistors into two or more series-coupled resistors; each coupling of series-coupled resistors constituting an instance of an inter-resistor node.

9. The method of claim 7, further comprising the step of coupling a first end of a first capacitor to said first input of said differential amplifier; and coupling a second end of said first capacitor to ground.

10. The method of claim 7, further comprising the step of coupling a first end of a second capacitor to said second input of said differential amplifier; and coupling a second end of said second capacitor to ground.

11. The method of claim 8, further comprising the step of coupling a first end of an instance capacitor to at least one instant node of said inter-resistor nodes, said instance capacitor being unique to each said inter-resistor node; and coupling a second end of each said instance capacitor to ground.

* * * * *